March 6, 1934.  A. L. RAVEN  1,949,487
MOTION PICTURE SCREEN
Filed April 26, 1930    3 Sheets-Sheet 1
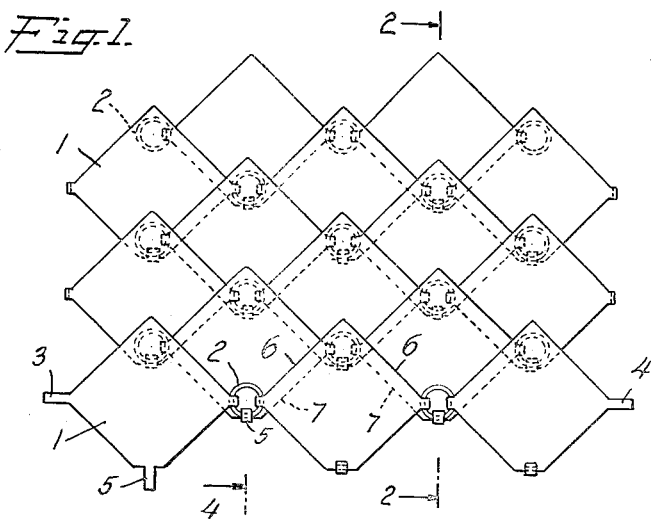
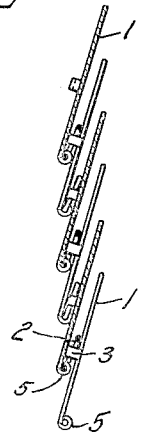
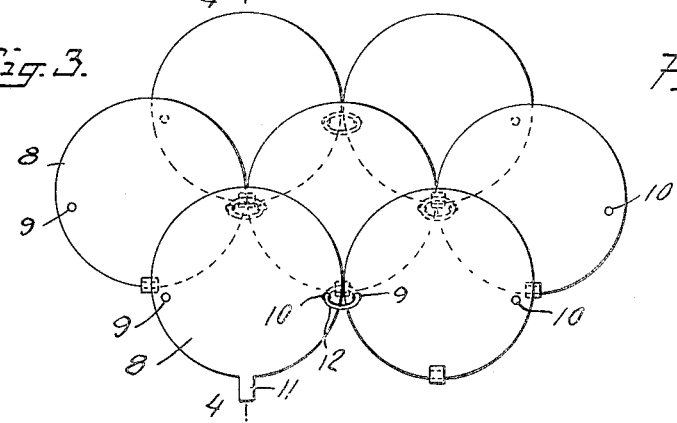
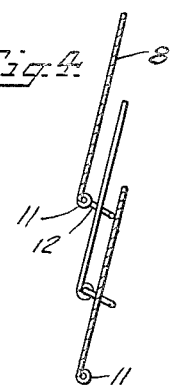
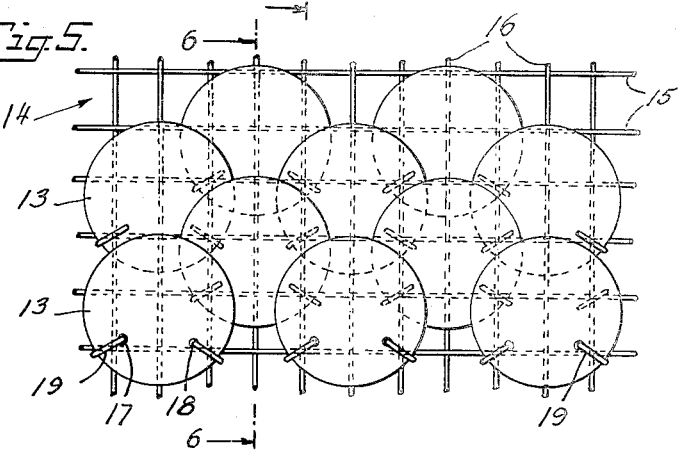
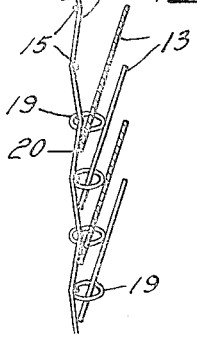
INVENTOR
Albert L. Raven
BY
HIS ATTORNEYS March 6, 1934.  A. L. RAVEN  1,949,487
MOTION PICTURE SCREEN
Filed April 26, 1930  3 Sheets-Sheet 2
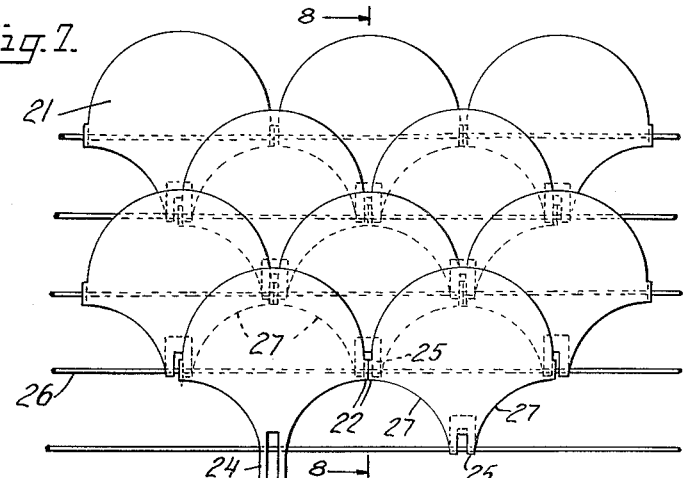
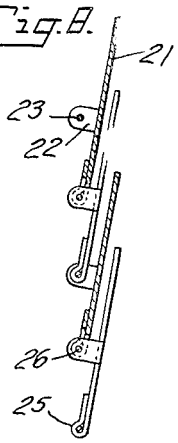
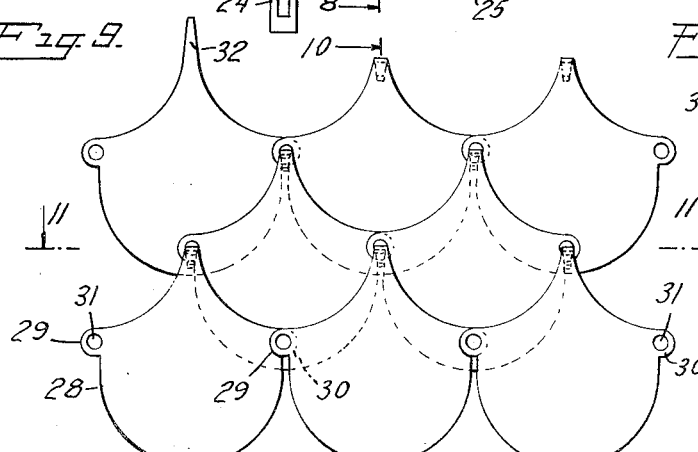
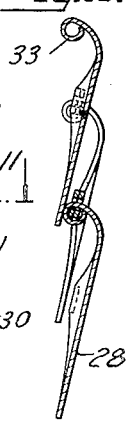
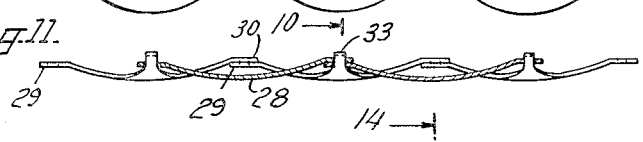
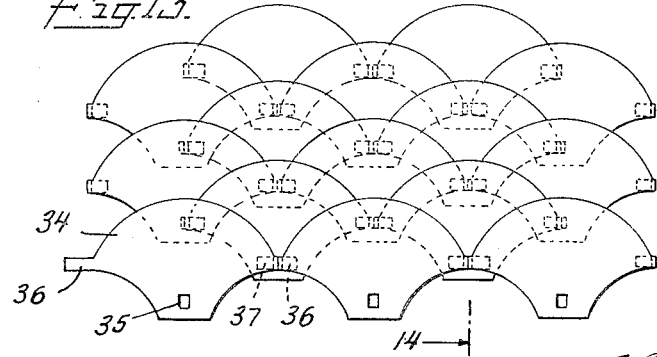
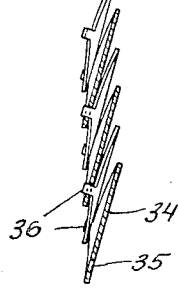
INVENTOR
Albert L. Raven
BY
HIS ATTORNEYS March 6, 1934.  A. L. RAVEN  1,949,487
MOTION PICTURE SCREEN
Filed April 26, 1930  3 Sheets-Sheet 3
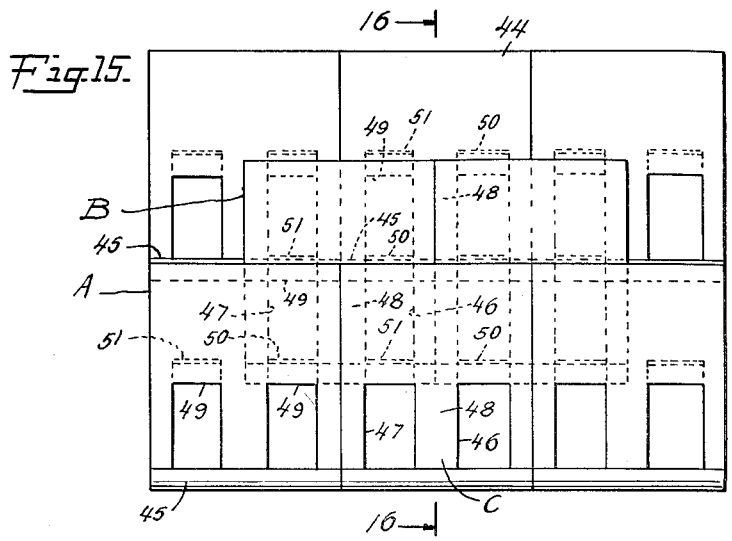
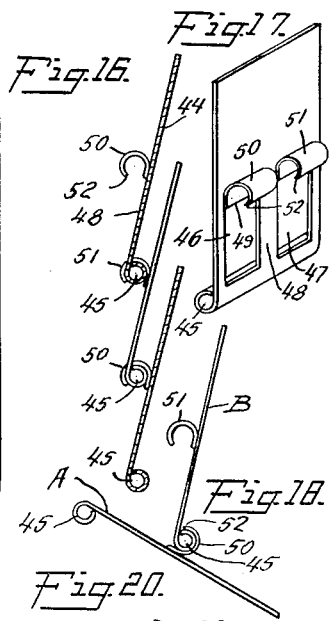
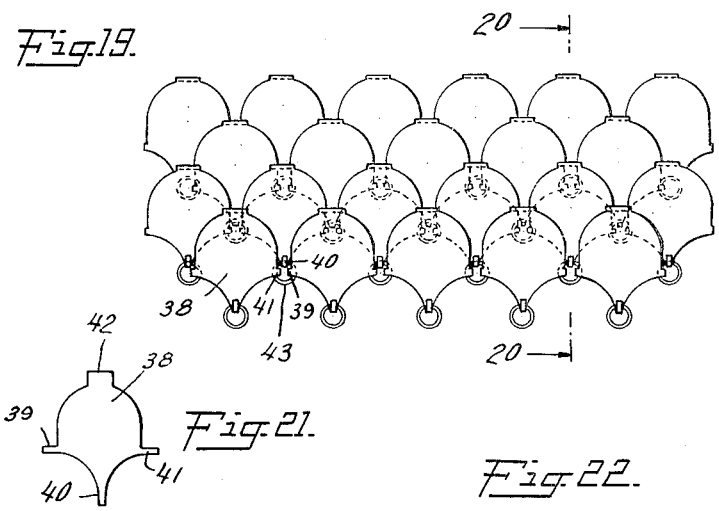
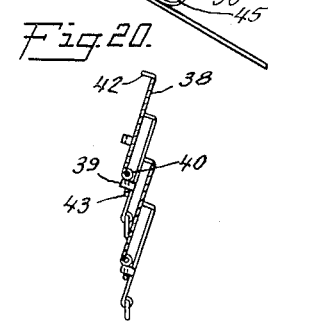
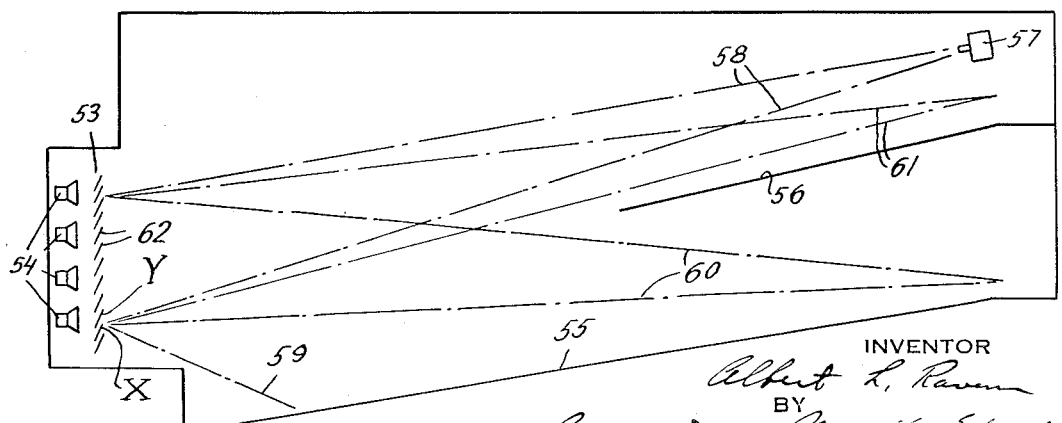

Patented Mar. 6, 1934

1,949,487

UNITED STATES PATENT OFFICE 1,949,487

MOTION PICTURE SCREEN

Albert L. Raven, Mount Vernon, N. Y.

Application April 26, 1930, Serial No. 447,610

24 Claims. (Cl. 88—24)

The present invention relates to picture screens intended for the showing of pictures accompanied by sound.

In order to properly show pictures accompanied by sound, and particularly talking motion pictures, it has been found necessary to have the sound transmitted through the picture screen itself rather than by placing the loud speakers around the edges of the screen. By placing the loud speakers directly behind the screen and providing a properly constructed screen, the sound, for example the voices of the actors in a talking motion picture, appear to proceed more nearly from the mouth of the person speaking. This is of particular importance with the advent of pictures which are shown on extremely large sized screens.

The proper construction of such a screen presents a number of problems. Both the proper reflection of the picture projected upon the screen must be provided for, and the screen must be so made that the sound will readily pass through it without being muffled or modified so as to change the character of the sound whether speech or music. The screen must function efficiently in both of these ways so that the transmission of the sound will not affect the reflection of the picture, and vice versa.

The screen furthermore must be easy to support in the theatre, must readily hang smooth in a single plane without wrinkling, it should be fire proof, and it should be so constructed that it will collect as little dust as possible and be susceptible of being cleaned easily from time to time.

Another important consideration is that the screen must be practicable to manufacture, and the manufacturing cost low.

The object of the present invention is to provide a screen which will meet these requirements among others, and the invention will be understood from a consideration of the accompanying drawings and the following description. There are illustrated in these drawings a number of embodiments of my invention but it is to be understood that the following is an exemplifying disclosure, merely, and the construction of the screen may be modified from the examples shown without going beyond the invention which extends to the scope of the appended claims.

In these drawings,

Fig. 1 is a front elevation of a small section of one form of my improved screen;

Fig. 2 is a vertical section taken on line 2—2 of Fig. 1;

Fig. 3 is a front elevation of a small section of a screen of modified construction;

Fig. 4 is a vertical section taken on line 4—4 of Fig. 3;

Fig. 5 is a front elevation of a small section of another modification;

Fig. 6 is a vertical section on line 6—6 of Fig. 5;

Fig. 7 is a front elevation of a small section of a further modification;

Fig. 8 is a vertical section on line 8—8 of Fig. 7;

Fig. 9 is a front elevation of a small section of a still further modification;

Fig. 10 is a vertical section taken on line 10—10 of Fig. 9;

Fig. 11 is a horizontal section taken on line 11—11 of Fig. 9;

Fig. 12 is a vertical section identical with Fig. 10 except that it is reversed in position to show that either face of this form of screen may be used for the projection of the picture;

Fig. 13 is a front elevation of a small section of still another form of screen;

Fig. 14 is a vertical section taken on line 14—14 of Fig. 13;

Fig. 15 is a front elevation of a small section of an additional modification;

Fig. 16 is a vertical section taken on line 16—16 of Fig. 15;

Fig. 17 is a perspective view of one of the elements of the screen shown in Fig. 15;

Fig. 18 is a view illustrating the manner of assembling the elements of Fig. 17;

Fig. 19 is a front elevation of a small section of one more form of screen;

Fig. 20 is a vertical section taken on line 20—20 of Fig. 19;

Fig. 21 is a front view of one of the elements of which the screen shown in Fig. 19 is made; and Fig. 22 is a diagrammatic vertical section of a theatre auditorium.

My improved screen is made up of numerous elements preferably of metal secured together so that the upper portions of the elements overlap the lower portions of vertically adjacent elements. The elements are so arranged that they are held in slightly spaced relation to their vertically adjacent neighbors thereby forming unobstructed oblique sound passages through the screen. The elements themselves may be made in a great variety of different shapes and secured to one another in many different ways as illustrated in the accompanying drawings. In the accompanying drawings the elements have been illustrated to a very greatly enlarged scale in order to show the construction clearly and it will be understood that in the actual screens the elements are preferably so small that their outline can scarcely be distinguished a few feet from the screen. Even when the individual elements are of comparatively large size, however, their outline and arrangement is such that from a short distance in front the screen appears to have an agreeable texture, and moreover a person viewing a picture projected upon the screen is unconscious even of this texture and it appears like a continuous surface.

Referring now to Figs. 1 and 2, the screen here illustrated consists of a plurality of substantially square or diamond shaped elements 1 each secured together by means of small rings 2. The elements are arranged in horizontal rows and the outline of the individual elements can be seen clearly in the lowermost row. Each element is provided with three projecting tongues for engagement with the rings 2. One of these tongues 3 is at the left hand horizontal corner of the element, a second tongue 4 is at the right hand horizontal corner, and a third tongue 5 is at the bottom corner, which is preferably bevelled off slightly as indicated in order to reduce the amount of overlap between the bottom corner of the element and the upper corner of the element in the row next below it.

In fastening the elements together by means of the rings 2, the tongues 3 and 4 of adjacent elements in each horizontal row are bent rearwardly through a ring 2 and encircled about the ring, while tongue 5 at the bottom of the element in the row next above is bent outwardly and encircled about the lower portion of ring 2. Hence the three elements thus connected by the ring are arranged in staggered relation. By repeating this procedure in securing together the other elements of the screen, the elements will be found to be arranged in both horizontal and vertical rows as shown in Fig. 1, with the upper corners of the individual elements overlying and concealing from view the rings 2 which secure together two of the elements in the row next above and one of the elements in the second row above.

In other words, the upper corner of each element conceals portions of two elements in the next row above and a portion of a single element in the second row above it and the lower corner of this element together with portions of two elements in the row next below are concealed by the upper corner of an element in the second row below.

The upper edges 6 of each element overlap slightly the lower edges 7 of the elements in the row next above it. The extent of this overlap is determined by the size of the rings 2 and the amount that the lower corner of each element is trimmed off. By securing the elements together in this manner they are held in parallel spaced relation as shown in Fig. 2 with the surfaces of the elements in each horizontal row parallel with those of the other rows above and below. The spacing between the elements is determined by the thickness of the rings 2, to some extent the thickness of the tongues 3, 4 and 5, and to a greater extent the closeness with which the tongues 3, 4 and 5 engage rings 2.

It is desirable to have the tongues engage the rings rather loosely as this increases the flexibility of the fabric and enables it to be handled easily and to be rolled up into packages of convenient size for shipment. When the screen is hanging in place the weight of the elements separates adjacent horizontal rows a somewhat greater distance than the combined thickness of the rings and tongues as may be seen from Fig. 2.

Referring now to Figs. 3 and 4, the elements in this form of the screen are round discs 8. They each have small holes 9 and 10 punched through them near their opposite edges and just below their horizontal diameter, and a tongue 11 projecting from their lower edges. These discs 8 are secured together in both vertical and horizontal rows similar to the elements 1 of Fig. 1 by means of rings 12, each one of these rings passing through apertures 9 and 10 of a pair of adjacent discs in the same horizontal row, and ring 12 being attached to a disc in the vertically adjacent horizontal row by means of its tongue 11 which is bent around the ring as shown in Fig. 4.

As in the case of the elements of Fig. 1, the connecting rings 12 are hidden by the upper portions of the discs in the row below. On account of the discs being round, however, the amount of overlap is greater and not so uniform as in the case of the screen of Fig. 1. The sound channels or passages are therefore somewhat longer.

The rings 12 hang downwardly from the bottoms of the discs and at an angle to the surface of the discs. The amount of this angle depends upon the looseness of the fit between the rings and the holes 9 and 10 in the discs, the larger the holes the nearer the rings hang to the vertical. The inner surfaces of the upper portions of the discs bear against the bottoms of the rings of the next course or row above. The weight of the discs as suspended from one another in this manner thus holds the rings and discs in close contact with one another thereby preventing the vibration of any of the parts of the screen in sympathy with the sound waves in the rear of the screen.

The screen of Figs. 5 and 6 is also constructed of circular discs 13. These discs instead of being suspended from one another are attached to a fabric 14. This fabric is very loosely woven and is in fact almost a netting and consists of horizontal threads 15 and vertical threads 16. The discs 13 are each provided with ring apertures 17 and 18 which are placed on the opposite sides of the vertical diameter of the disc and in its lower half. Rings 19 pass through these apertures over the edge of the disc and loop both a horizontal and vertical thread at an intersection thereby securing the disc in position so that it cannot shift either vertically or horizontally. The distance between the vertical threads 16 is preferably made one-half the distance between the ring apertures 17 and 18 so that the lower portion of each disc may rest in contact with one of these vertical threads as indicated at 20 in Fig. 6.

The size of the rings 19 is such as to allow the discs 13 to fall away from the plane of the fabric 14 as shown in Fig. 6, thereby supporting the discs at a slight angle to the plane of the fabric and in spaced relation to one another so as to form oblique sound channels through the screen directed upwardly from the rear toward the front face of the screen, substantially the same as in the screens of Figs. 1 and 2.

Each one of the elements 13 is supported by its own weight upon the fabric 14 by means of a three point support comprising the two rings and the contact 20 with a vertical thread of the fabric. The placing of the rings as near to the bottom edges of the discs as possible increases the pressure on the three supports.

Discs 13 are spaced apart horizontally instead of being in contact with one another as in the screen of Fig. 3, and hence the length of the sound passages is not as great and the same area of screen can be manufactured with a smaller number of discs.

In the screens shown in Figs. 7 to 14 inclusive and 19 and 20, the elements differ from the elements of the screens previously described, since the elements are not symmetrical with respect to both axes. The elements of these screens, however, are symmetrical with respect to their vertical axes but not with respect to their horizontal axes.

Referring now to Figs. 7 and 8, this form of screen is made of elements 21 which have convex and substantially semicircular upper edges, and bluntly pointed lower edges. Each element 21 is provided at each side with an ear formed by a projection which is bent back at right angles to the body of the element. These ears are punched with small holes 23. At their lower ends the elements are slotted as shown at 24 in the left hand element of the lowermost row of Fig. 7, and the lower part of the bluntly pointed end of the element is bent upon itself forming bifurcated or double eyes 25. The elements are arranged in both horizontal and vertical rows with the elements of adjacent horizontal rows staggered with respect to one another as in the case of the previous forms. Ears 22 of adjacent elements are in contact with one another and the bifurcated eye 25 of the element in the horizontal row next above spans these two ears 22 and a small rod or wire 26 passes through the apertures 23 and the eye 25.

All of the elements 21 are secured together in this way with the result that parallel wires 26 extend horizontally across the back of the screen. There are as many of these wires 26 as there are horizontal rows of elements. The elements are securely fastened together by this arrangement since the horizontal wires hold the rows in proper vertical spaced relation, and the double eyes 25 hold the adjacent rows in properly staggered relation.

Inasmuch as apertures 23 are located farther in the rear of the elements than the apertures of the eyes 25, when the screen is hung the weight of the elements will cause apertures 23 and the apertures of eyes 25 to seek a common vertical plane, thereby causing the elements to assume a parallel spaced position slightly oblique to the plane of the screen as shown in Fig. 8. In this way oblique sound passages are provided passing upwardly from the rear toward the front of the screen.

The lower portions of the elements 21 are preferably cut away as shown at 27 between their centrally located blunt points and their sides just below the ears 22 so as to save material and also so as to reduce the overlap of the elements of adjacent horizontal rows thereby shortening the length of the sound passages. The curvature of these cut away portions 27 is preferably as nearly as possible the same as the curvature of the upper edges of the elements.

In Figs. 9 and 10 the elements 28 of which the screen here shown is made up, are about the same in outline as elements 21 previously described. They are provided at each side with ears 29 and 30, but these ears are not bent rearwardly as in the case of ears 22. These ears are provided with relatively large apertures 31 as shown. Elements 28 are provided at their pointed ends with a relatively narrow projection 32 which is located on the vertical center line of the element.

The elements in the screen shown in Figs. 9 and 10 are upside down with respect to the elements of the screen shown in Fig. 7, and they therefore overlap in the reverse manner so that the sound passages will pass upwardly from the rear toward the front of the screen. Elements 28 are secured together in both horizontal and vertical rows by overlapping ears 29 and 30 of adjacent vertical elements and by passing through their apertures 31 a projection 32 of an element in the next lower horizontal row, and bending this element rearwardly to form a curved eye 33, bending the extremity of this eye beneath the lower portions of ears 29 and 30.

When the screen is hung the elements assume a position in parallel spaced relation slightly oblique to the plane of the screen because of the fact that eyes 33 are located to the rear of the body of the elements whereas the ears 29 and 30 are in the plane of the elements. The elements 28 instead of being flat like the elements 1, 8, 13 and 21, are slightly curved for the purpose of throwing more of the reflected light toward the sides of the theatre. It will be understood, however, that elements 1, 8, 13 and 21 may be similarly curved, if desired, and also that elements 28 may be made flat.

The screen of Figs. 9 and 10 differs from the screens shown in the other figures of the drawings in that the joints by which the several elements 28 are connected are not concealed. It will be observed, however, from Fig. 9 that tongues 32 are preferably of a width to fit the apertures 31 so that the apertures are fairly well filled up by these tongues. The open spaces left in apertures 31 above the tongues are so small that they are not very noticeable. The screen is preferably given a light reflecting coating for the purpose of imparting to it appropriate light reflecting properties. Thus, for example, one or more coats of lacquer, paint, or the like, may be applied to the face of the screen, and in addition to imparting the desired light reflecting properties this coating will also serve to fill the open spaces of apertures 31.

In Fig. 12 there is illustrated a vertical view of a screen which is constructed substantially like that shown in Figs. 9 and 10 except that the elements 28 have their bottom edges turned upwardly and hence are assembled so as to overlap one another in the reverse direction, thereby preserving the sound channels in their upward oblique position toward the base of the screen. In this modification of the screen, the joints between the elements are concealed by the upper portions of elements in the rows below.

In Figs. 13 and 14 the elements 34 are somewhat similar to elements 28. They are provided with a central rectangular slot 35 close to their lower edges and with bendable tongues 36 and 37 on each side. They are assembled into the form of a screen by inserting a left hand tongue 36 and a right hand tongue 37 of two adjacent elements in a horizontal row through slot 35 to an element in the row next above, and bending the tongues against the rear surface of the element. These elements 34 are each curved and their curvature causes them to assume the spaced oblique relationship shown by the sectional view, Fig. 14. The angle which they make with respect to the plane of the screen as well as the area of the oblique sound passages between them is determined by the amount of curvature of the individual elements.

The form of screen illustrated in Figs. 19 and 20 is somewhat similar to the forms illustrated in Figs. 1 to 6 inclusive in that the elements are secured together by rings while the shape of the elements is in general similar to those shown in Figs. 7 to 14. Elements 38 are as shown in Fig. 21, provided with three narrow projecting tongues 39, 40 and 41, and, if desired, with a fourth somewhat wider and shorter tongue 42. The elements are secured together in both horizontal and vertical rows by means of rings 43. Into each ring tongues 39 and 41 of each of two adjacent elements in a horizontal row are hooked, and the centrally located lower tongue 40 of the elements in the row next above. This places the elements of the two adjacent horizontal rows in staggered relation.

It will be observed that in connecting tongues 39 and 41 with the ring 43 that the tongues are bent rearwardly in curving about the ring thereby placing the ring at the rear of these two elements. Also in attaching tongue 40 of the element in the next row above, this tongue instead of being bent rearwardly is bent forwardly toward the face of the screen in curving it about the ring. The ring is thereby placed in front of the element just referred to and between this element and the two elements in the row next below. Hence the adjacent rows of elements will hang in spaced relation to provide oblique sound channels through the screen extending upwardly from the rear toward the front.

Preferably, however, the upper tips of each of the elements are provided with the short wide tongues 42 which are bent rearwardly at right angle to the body of each element 38. These projections are of sufficient width to span the spacing between the elements of the next row above. These projections serve to maintain the adjacent horizontal rows at a fixed uniform spacing, and may thus produce somewhat larger sound channels than by depending merely upon the rings 43 alone for producing the spacing.

The rings 43 are concealed from view by the upper portions of the elements in the adjacent lower rows. The concealment of the joint formed by the rings is also aided by projections 42. Projections 42 also form a support for the upper portions of the elements, and aid in reducing vibration.

The form of screen shown in Figs. 15 and 16 is made up of rectangular elements 44 as illustrated in Fig. 17. The metal at the lower edge of the elements is in the form of a circular bead 45 extending across the entire lower edge of the element. In the lower half of the element two rectangular openings 46 and 47 are formed side by side by cutting out rectangular sections of the element leaving a vertical central portion 48 between these openings. The metal which is cut out to form the openings 46 and 47 is left attached to the body of the element along the upper edges 49 of the openings and is bent to form a pair of curved connectors 50 and 51. Each of these connectors is bent so that the curvature on the inside thereof will correspond to the curvature of the bead 45. The lower edges 52 of the connectors are carried around somewhat more than a semicircle so as to partially close the entries to the interior of the connectors.

The elements 44 are assembled as illustrated in Fig. 18. Element A is swung to approximately the horizontal position so that the inner end 52 of one of the connectors 50, for example, will clear the vertical body of element B of the next row above. Element A is then swung downwardly and connector 50 is thereby hooked around bead 45 of element B. It will be seen from Fig. 15 that one-half of the upper portion of element A overlaps one-half of the lower portion of element B. A third element C is now attached to element B in the same way and by repetition of this process the entire screen is constructed.

The widths of the connectors 50 and 51 of elements A and C respectively are such as to fit nicely between the sides of apertures 47 and 46 respectively of element B so that the elements are secured together in the desired relationship. The abutting edges of the upper portions of elements A and C are directly in front of central portion 48 of element B so that any light that may possibly pass between these abutting edges is prevented from passing through the screen. The upper edges of elements A and C extend upwardly in front of and therefore overlap the upper edges 49 of openings 46 and 47.

On account of the fact that the beads 45 are rolled on the front of the elements, and the connectors 50 and 51 are formed on the rear of the elements, when the screen is hung the joints between the elements will hang in a vertical plane, and the elements themselves will therefore be positioned as shown in Fig. 16 in parallel spaced relation to one another at an oblique angle to the plane of the screen.

Referring now to the diagram of the theatre illustrated in Fig. 22, the sound screen 53 is appropriately hung at the front of the auditorium with a plurality of loud speakers 54 arranged behind it. The orchestra floor is indicated at 55 and the balcony at 56. The projector is indicated at 57. The broken lines 58 indicate the boundary rays from the projector and line 59 indicates the boundary ray from the lower edge of the screen coming to a person in the front row of the orchestra. Lines 60 are the boundary rays coming to a person at the rear of the orchestra and lines 61 are the boundary rays coming to a person in the balcony.

The elements 62 which compose the screen 53 must overlap sufficiently to prevent the lower boundary ray from the projector from passing through the screen. The overlap must also be sufficient to prevent the observer in the balcony from being able to see through the screen between the elements along the line of lower boundary ray 61. On account of the fact that the apertures through the screen pass upwardly from the rear toward the front, the shadows cast by the individual elements will be invisible to the spectators. Take any two individual elements X and Y for example. The shadow cast by the upper edge of element X will fall on element Y at a point below the upper edge of element X. Hence it is invisible to any observer positioned below the lower boundary ray 58 from the projector.

All of the various forms of screen described above can easily be made with sufficient overlap to satisfy the conditions of the ordinary theatre, and they also provide sound passages of ample area so that the sound is readily transmitted through the screen. These passages are distributed over the entire area of the screen so that all portions have equal sound-transmitting properties. These screens, moreover, are constructed in such manner that they are not set in vibration sympathetically by the sound producing apparatus so as to interfere with the reception of the sound by the audience. By making the screens of individual elements and assembling them as described, the screen can be produced economically and some forms of screen can be manufactured on automatic machinery already in common use for the manufacture of mesh fabric.

The supporting of a screen of this general type presents something of a problem. It is necessary that the screen hang flat without wrinkles, in order to provide a proper showing of the picture. The screen fabric made by means of the overlapping elements in accordance with my present invention, however, can be hung without great expense and this is an important consideration since the cost of such a screen is necessarily much greater than the cost of the perforated woven fabric screens heretofore used.

Another advantage of my improved screen is that even though the elements are arranged in straight rows horizontally and are preferably also arranged in straight rows vertically, and also even though the elements themselves are of uniform shape, nevertheless at a relatively short distance from the screen the outline of the individual elements cannot be distinguished, but the elements blend together giving the appearance of texture to the screen surface. This may be accounted for in some forms of the screen by the irregular outline of the elements, and in some forms of the screen to the fact that the elements are of small size compared to the size of the screen.

The appearance of straight lines or the recurrence of any particular figure in the surface of the screen which might be visible in a picture projected upon the screen is entirely done away with.

The elements of the improved screen can be coated with any reflecting material desired, for example, for narrow theatres where most of the light is to be reflected within a small angle from the line of projection, the elements may be coated with specular material. Where, however, the screen is to be used in a wide theatre and it is of importance to have the picture as bright as possible at wide angles horizontally from the axis of projection, the elements can be given a fine grained coating which will diffuse the light. The improved screen can also be cleaned either by a blast of air for the purpose of removing the dust, or by washing, or both.

I claim:

1. A screen for the projection of pictures accompanied by sound comprising a plurality of elements arranged in horizontal rows, the elements in adjacent rows being staggered and overlapping one another in spaced relationship, and means for maintaining them in said position thereby forming a screen having numerous sound passages therethrough.

2. A screen for the projection of pictures accompanied by sound comprising a plurality of elements arranged in horizontal rows, the elements of each row overlapping the elements in the row next above, the elements being staggered laterally, means for maintaining said rows of elements in parallel spaced relation oblique to the plane of the screen thereby forming a screen having numerous sound passages therethrough, but appearing from a slight distance in front thereof to have a continuous picture reflecting surface.

3. A screen for the projection of pictures accompanied by sound comprising a plurality of elements arranged in horizontal rows, the elements in each row overlapping the elements in the row next above, the elements being staggered laterally, and means for maintaining said rows of elements in parallel spaced relation oblique to the plane of the screen to provide sound passages therethrough, and the exposed portions of said elements being of uniform shape and size and small compared to the dimensions of the screen and producing a screen which when viewed from a short distance in front thereof appears to have a picture projecting surface of agreeable texture.

4. A screen for the projection of pictures accompanied by sound comprising a plurality of elements arranged in horizontal rows, the elements in each row overlapping the elements in the row next above, the elements of adjacent rows being staggered, and means for maintaining said rows of elements in parallel spaced relation oblique to the plane of the screen to provide sound passages therethrough, the exposed portions of said individual elements having upwardly extending projections whereby the rows have non-continuous upper edges, the effect when viewed from a short distance in front being a screen of agreeable uniform texture of which the viewer is unconscious when a picture is projected upon the screen.

5. A screen for the projection of pictures accompanied by sound comprising a plurality of elements arranged in horizontal rows, the elements in each row overlapping the elements in the row next above, and being staggered with respect thereto, and means for securing each element to its neighbor in the same horizontal row and to a staggered element in the row next above, said securing means being arranged to hold the horizontal rows in spaced substantially parallel relation to provide sound passages through the screen.

6. A screen for the projection of pictures accompanied by sound comprising a plurality of elements arranged in horizontal rows, the elements in each row overlapping the elements in the row next above, and being staggered with respect to the elements of such row, means for securing each element to its neighbor of the same horizontal row and to a staggered element in the row next above, said securing means being arranged to hold the horizontal rows in spaced substantially parallel relation to provide passages through the screen, and said securing means being concealed by an element in a row below.

7. A screen for the projection of pictures accompanied by sound comprising a plurality of elements arranged in horizontal rows, means for securing each side of each element to the adjacent side of its neighbor in the same row and to the center of the bottom of an element in the row next above, said securing means being arranged to hold the rows in spaced substantially parallel relation to provide sound passages through the screen, the upper portions of each of said elements extending in front of a securing means in the row next above so as to conceal the same.

8. A screen for the projection of pictures accompanied by sound comprising a plurality of elements arranged in horizontal rows, each of said elements having a projecting tongue at each side and at the center of the bottom thereof, a ring between each pair of elements in each row, one of said projections from the side of each of said elements being bent through said ring and the projection at the center of the bottom of an element in the row next above also being bent through said ring, the three elements being thereby secured together in spaced substantially parallel relation, the upper portion of each element extending upwardly in front of a ring in the row next above to conceal the same.

9. A screen for the projection of pictures accompanied by sound comprising a plurality of elements arranged in horizontal rows, a tongue projecting from the sides and from the center of the bottom of each element, a ring joining each pair of adjacent elements in each horizontal row, a tongue at one side of each element being bent through and engaging diametrically opposite sides of said ring, the tongue at the bottom of the element in the row next above being bent through and engaging the bottom of said ring whereby said ring is positioned between the bottom of said last named element and the upwardly projecting portion of an element in a lower row, so as to hold said elements spaced apart in substantially parallel relationship thereby forming oblique passages extending from the rear toward the front of the screen, and said ring being concealed by said upwardly projecting portion of the element in said lower row.

10. A screen for the projection of pictures accompanied by sound comprising a plurality of elements, each of said elements being provided with apertures at the extremities of its horizontal diameter and a ring secured to the center of the bottom thereof and turned forwardly, said elements being arranged in horizontal rows with the rings thereof passing through the apertures at the adjacent sides of two elements in the row next below, thereby securing said elements together in slightly spaced relationship substantially parallel to one another and oblique to the plane of the screen.

11. A screen for the projection of pictures accompanied by sound comprising a plurality of elements arranged in horizontal rows, the elements of each horizontal row overlapping the elements in the row above it, the elements being staggered laterally, and means for maintaining said elements in said relationship comprising horizontal and vertical strands at the back of the screen, and a pair of rings passing through apertures in each element and embracing both a vertical and a horizontal strand.

12. A screen for the projection of pictures accompanied by sound comprising a plurality of elements arranged in horizontal rows, the elements in each horizontal row overlapping the elements in the row next above it and the elements being staggered laterally, and means for maintaining said elements in said relationship comprising a plurality of parallel spaced strands, each of said elements being provided with rearwardly projecting ears at the extremities of the sides thereof and an eye at the center of the bottom thereof, each of said strands passing through said ears and through the eyes of the elements in the row next below.

13. A screen for the projection of pictures accompanied by sound comprising a plurality of elements, each of said elements having a centrally located projection at one of its vertical extremities, and an aperture at the extremity of each side thereof, said elements being arranged in horizontal rows with the elements in each row overlapping the elements in the row next above it with the elements thereof in staggered relation, and the elements being secured together by said central projection of one element engaging the apertures of the element of the adjacent horizontal row.

14. A screen for the projection of pictures accompanied by sound comprising a plurality of elements, each of said elements having a projection at the extremity of its sides, and an aperture at the central portion of its lower extremity, said elements being arranged in horizontal rows with the projections of adjacent elements in each row inserted within the aperture of an element in the adjacent horizontal row, the elements being thereby secured together in staggered relationship with each row overlapping the row next above it, each of said elements being curved from side to side thereby causing the centers of said elements to be held in spaced relationship and forming sound passages passing through the screen upwardly from the rear to the front face thereof.

15. A screen for the projection of pictures accompanied by sound comprising a plurality of elements, each of said elements having a round bead projecting forwardly from its lower edge and a pair of curved connectors projecting rearwardly from the mid portion of the element, said elements being arranged in horizontal rows with the elements in each row overlapping the elements in the row next above it, each pair of adjacent elements of one row being secured to a single element in the row next above by the engagement of said connectors with the bead of the element in the upper row, the elements being thereby secured together in spaced staggered relationship.

16. A screen for the projection of pictures accompanied by sound comprising a plurality of elements, each of said elements having a projection at its opposite sides and at the extremity of the bottom edge thereof, said elements being arranged in horizontal rows, a ring between each pair of elements in a row, the projections at the sides of said elements being bent through said ring and the projection at the lower extremity of an element in the row next above also being bent through said ring, the upper portions of said elements projecting upwardly to cover the connecting rings in the row above, and a spacing projection attached to said upper portions of sufficient width to engage two adjacent elements and serving to hold said horizontal rows of elements in spaced substantially parallel relationship thereby forming oblique sound passages passing upwardly through the screen from the rear toward the front.

17. In a moving picture screen, a plurality of units arranged in overlapping relation, means connecting the units to provide a screen panel which will resist the passage of light, and means carried by each unit to space the units to provide for the passage of sound.

18. A sound-transmitting picture screen for the projection of pictures accompanied by sound comprising a fabric of metal elements, having interstices therebetween for the passage of sound, flexibly hinged together in two directions at right angles to one another to form a limp sheet, and having a light-reflecting surface to receive the projected picture.

19. In a moving picture screen, a plurality of units arranged in overlapping relation, means connecting the units to provide a screen panel which will resist the passage of light, and lugs extending from said units and engaging other units to space the units apart and provide for the passage of sound.

20. In a moving picture screen, a plurality of units arranged in overlapping relation, means individual to each unit and engaging adjacent units to flexibly connect said units, and means to space the units to provide for the passage of sound.

21. In a moving picture screen, a plurality of units arranged in overlapping relation, means connecting the units to provide a screen panel which will resist the passage of light, and means extending from the face of each unit and engaging the opposed face of an adjacent unit to separate the units and provide for the passage of sound.

22. A screen for the projection of pictures accompanied by sound comprising a plurality of elements arranged in horizontal rows, the elements of each horizontal row being spaced from and overlapping the elements in the row above it, the elements being staggered laterally, and means for maintaining said elements in said relationship comprising horizontal and vertical strands at the back of the screen, and attachments for securing said elements to said strands.

23. A screen for the projection of pictures accompanied by sound comprising a plurality of elements arranged in horizontal rows, the elements in each horizontal row being spaced from and overlapping the elements in the row next above it and the elements being staggered laterally, and means for suspending the rows of elements one from another comprising a horizontal rod for each row of elements, and means for attaching thereto the elements of two adjacent rows.

24. A screen for the projection of pictures accompanied by sound comprising a plurality of elements arranged in horizontal rows, each of said elements having a projecting tongue at each side and at the center of the bottom thereof, a ring between each pair of elements in each row, one of said projections from the side of each of said elements being bent rearwardly through said ring and the projection at the center of the bottom of an element in the row next above being bent forwardly through said ring, said ring being disposed in front of said element to space the other two elements therefrom, and the upper portion of each element extending upwardly in front of a ring in the row next above to conceal the same.

ALBERT L. RAVEN.